3,320,177
PROCESS FOR MAKING NUCLEAR FUEL
MATERIALS
Carroll J. Halva, Lynchburg, Va., assignor to The Babcock
& Wilcox Company, New York, N.Y., a corporation of
New Jersey
No Drawing. Filed Apr. 1, 1966, Ser. No. 539,278
30 Claims. (Cl. 252—301.1)

This invention relates generally to a method of producing refractory materials, and more particularly to a method for producing mixed oxide ceramic nuclear fuel material.

A process, referred to commonly as the "sol-gel process," is presently known for producing thoria/urania mixed oxide refractory particles suitable for use in the fabrication of nuclear fuel elements by vibratory compaction or swaging. In this process, crystalline thorium nitrate is denitrated in a steam atmosphere to produce finely divided thoria powder which, when mixed with dilute nitric acid, forms an aqueous thoria sol (colloid). Fissionable material, in the form of uranyl nitrate is added to the sol, and under properly maintained conditions, the uranium associates itself with the collodial thoria products. To insure homogeneity of the thus prepared sol, the mixture is strongly agitated and heated to about 80° C. for an hour or longer. The finished sol is then emptied into evaporator trays and is slowly evaporated to dryness, the dry residue being a thoria gel comprised of random size and shaped particles or shards. These particles range in size from that of extremely fine dust to granules of about ¼" size. The next step in the process is the conversion of the dried gel to a dense oxide form. This is accomplished by calcining the gel at about 1150° C. for about four hours in an argon-hydrogen gas atmosphere. The resulting product has an extremely high density, e.g. 99+% of theoretical, which renders it particularly desirable for use in fuel elements. Upon grading of the particles (the grading may be done either before or after the calcination) to provide an outimum consist of particle sizes, the next step in the process is the vibratory compaction or swaging of the selected particles into the desired shape and form of the fuel element.

This process has been further improved in that a method for producing spheroidal shaped gel particles has been devised, which improved method is commonly referred to as the "modified sol-gen process." The modified process is similar to the original process up to and including the addition of the uranyl nitrate to the thoria sol and the agitation of the mixture to insure homogeneity. Instead of being dried in the usual manner, the completely prepared sol is converted to gel spheres by injecting a predetermined sized stream of the fluid sol into a dehydrating organic solvent. The sol droplets undergo a free-fall through the organic solvent, and by properly arranging equipment to provide sufficient retention time of the sol in the solvent, the sol droplets emerge as gel spheres having little tendency to stick to each other. Thus, in the modified sol-gel process the dehydration of the sol occurs by extraction of the water from the sol by the organic solvent instead of by evaporation as in the original process. The gel spheres are then calcined in the same manner as are the shards in the original process. The spheroidal particles are manifestly more readily adaptable to more precise size grading, classification and compaction than are the random shaped shards of the original "sol-gel process."

As intimated above, either form of the "sol-gel process" produces more uniformly infused, high density particles than any other heretofore known technique employing such a low calcining temperature (prior techniques required calcination temperatures of about 1800° C.). Nevertheless, both forms of the process have common drawbacks which render conduct of the process expensive and tedious. In either form of the process the extremely expensive fissionable material is committed at an early stage, i.e. in the sol stage. Since fissionable material (uranyl nitrate) and a moderator (water) are present during the sol preparation and during the evaporation of the sol, criticality control is an absolute requiremetn and limits not only the size and configuration of the process equipment, but also the size of the batch quantities that can be produced. Furthermore, the particle size classification into a proper consist suitable for compaction must necessarily be accomplished after the fissionable material has been committed to the process. It follows that a portion of the produced particles will be rejected in the size grading, and will have to be reprocessed for purposes of disposal and/or recovery of the expensive fissionable material with attendant considerable expense.

Accordingly, it is an object of the present invention to provide an improved method, hereinafter referred to as the "gel-addition process," of producing mixed oxide ceramic nuclear fuels, the improvement being adaptable to both the "sol-gel process" and the "modified sol-gel process" as described above. More specifically, it is an object of the present invention to effect substantial economies in the disposition and use of the relatively expensive fissionable material and to substantially reduce criticality problems attendant with the known processes.

These and other known objects are attained according to the present inventive method for producing mixed oxide ceramic nuclear fuel material, which method encompasses the step of contacting a gel of an inorganic fertile material with a fissionable material in liquid phase to directly impregnate the gel with the fissionable material. The invention also encompasses the precedent steps of preparing a colloid of an inorganic fertile material and drying the colloid to form the gel. The drying operation may be performed in either of the above described manners to produce either shards or spheroidal particles of the fertile material. Further, the invention includes the subsequent step of calcining the fissionable material impregnated gel to thereby densify the gel so as to render it suitable for compaction into a nuclear fuel element.

The process may be used to produce any mixed oxide nuclear fuel wherein the fertile material is thoria or urania, and the fissionable material is urania or plutonia.

For a better understanding of the invention, its scope, its operating advantages, and specific objects attained by its use, reference should be had to the following description.

The present invention will be hereinafter described in terms of the production of a particular mixed oxide nuclear fuel material, i.e. thoria/urania; however, it is not the intention of the applicant that the scope of the invention be limited to this particular nuclear fuel material.

The applicant's "gel-addition process" for producing nuclear fuel material is a variation of the known "sol-gel process" and the "modified sol-gel process" and similarly begins with the preparation of a thoria sol or colloid. The starting material is preferably crystalline thorium nitrate, which material is subjected to denitration in a steam atmosphere at temperatures approaching 500° C. to thereby produce finely divided thoria powder. The powder is then mixed with water and some suitable acid, preferably nitric acid, to form a thoria sol, i.e., an aqueous colloid. Up to this point in the process, it is similar to the known "sol-gel process." In the improved process, however, fissionable material is not added to the thoria colloid as such; rather, the colloid is dried to produce the gel form of thoria. This drying process may be carried out by conventional evaporative drying means to produce random shaped gel shards, or may alternatively, and preferably, be dried by passage of sol droplets through a drying or dehydrating solvent to thereby produce dried gel spheres. It should be noted that the size of these spheres can be controlled, at least to some extent, by properly sizing an injection nozzle through which a stream of the thoria sol is introduced into the drying solvent. After the gel spheres are dried sufficiently so that they do not have a tendency to stick together and thus can be readily handled, they are sorted into various particle size groups, and the proper amounts of spheres from each size group are selected to produce a consist for further processing, the side selection being determined by the particular requirements for dense compaction as dictated by the known fuel element compacting processes. The unselected particles or spheres are at this point withdrawn from the process, and may be stored for subsequent utilization or disposal.

It should be noted at this point that the material required to prepare the thoria gel particles is relatively inexpensive as compared to fissionable material, and since the unselected particles of thoria gel might require some reprocessing to make it acceptable for use, disposal of such material would not be particularly expensive insofar as fuel preparation costs are concerned. Moreover, recovery and recycle of the fertile material is a simple and inexpensive matter as compared to recovery and recycle of fissionable material. It should be further noted that up to this point in the process there has been no introduction of fissionable material. Accordingly, it should be recognized that the process may be carried out to the gel stage and through the size classification stage without any problems of criticality of the material being prepared, thereby reducing substantially the tediousness of the process and the expense in design of the material handling equipment. Moreover, since the criticality problem is eliminated, there is no limitation on the batch size of gel particles that can be produced, and it is even conceivable that the process could be carried out on a continuous basis up to this point.

Having selected the particular thoria gel particles to be treated, the next and most important step is the contacting of the gel particles with a fissionable material in liquid phase to directly impregnate the gel particles with the fissionable material. Preferably the fissionable material is in liquid solution, and even more specifically an aqueous solution of uranyl nitrate is preferred as the fissionable material bearing solution. Respecting the step of contacting the gel with the fissionable material, it should be noted that fissionable material is in hexavalent form at the time it is contacted with the gel. The contacting may be carried out in conventional equipment, e.g. the uranium solution may be passed over a stationary column of the thoria gel, or the uranium solution may be placed in a tray of any vessel containing thoria gel and the mixture stirred. By maintaining the fissionable material bearing solution at a predetermined concentration, and by maintaining this solution in contact with the thoria gel particles for a predetermined period of time, the degree of impregnation or infusion of the fissionable material into the thoria particles can be controlled. At this point, there is present in the process fissionable material and a moderator, so that criticality design standards and operational procedures must be employed. After the impregnated gel particles have been removed from contact with the fissionable material bearing solution, the particles are calcined by firing at a temperature above 1100° C. for an extended period of time in an argon-hydrogen gas atmosphere to thereby densify the resultant product. It should be noted that during the calcining process the uranium (hexavalent state) is converted to the quadrivalent oxide ($UO_2$). After firing, the densified mixed oxide fuel material may be compacted into the desired form and shape of fuel element by any of the known processes, such as vibratory compaction or swaging.

The physical characteristics of the material produced in the above-described improved method are similar to the characteristics of the material produced in the original or modified "sol-gel process." The particles (shards or spheres) produced by calcination of the gel particles have a density of 99+% of theoretical, and are extremely hard and exhibit extremely high crush resistance characteristics. By using a precalculated particle size consist and known methods of compacting the particles into the desired fuel element shapes, the material can be compacted to a bulk density of slightly above 85% of theoretical in the final fuel element product.

It should be noted that the above-described process is applicable when the particles produced are shards or spheres; however, for reasons of predictability and uniformity, the spheroidal particles are generally preferred.

Particular note should be made of the point in the above-described process at which the expensive fissionable material was committed. In the applicant's improved process, this material is not committed until after the proper size consist of gel particles have been selected from the total batch of gel particles produced. Since, except for a negligible loss due to particle breakage, the selected particles become the final product, it is obvious that there is substantially no rejection of any particles to which the fissionable material has been committed. Accordingly, there is also no need for disposal and/or reprocessing of rejected fissionable material, and the costs of equipment and time for carrying out these tedious operations are thereby eliminated.

In the known "sol-gel process," wherein the fissionable material is added to the sol or colloidal form of the fertile material, the maximum concentration of fissionable material in the calcined finished product is about 6 atom percent (fissionable material/fissionable material and fertile material). In the herein described "gel-addition process" no such upper limit appears to prevail. For example, in one laboratory experiment, a thoria/urania fuel material having a concentration of 15 atom percent uranium was produced; moreover, there is no evidence that even this represents the upper limit of fissionable material concentration. It is therefore apparent that the herein disclosed "gel-addition process" may be used to produce fuels having a higher fissionable material concentration than those producible by the known "sol-gel process." The higher fissionable material concentration capabilities render the herein disclosed method potentially useful in producing nuclear fuels for the so-called fast breeder reactors.

The invention has been described above in terms of a method for producing thoria/urania nuclear fuel; however, it also encompasses the production of other mixed oxide nuclear fuel materials, i.e. urania/urania and urania/plutonia.

In the urania/urania nuclear fuel material, the fertile material is uranium U–238, while the fissionable material is uranium U–233 or U–235, preferably the latter. The process for preparing the urania/urania fuel material starts with an aqueous solution of uranyl nitrate in which uranium is present in the hexavalent form. The first step in the process is the reduction of the uranium to the quadrivalent form in a known fashion, the reduction taking place over a platinum catalyst in a hydrogen pressurized autoclave. The resultant quadrivalent uranium nitrate is chemically unstable, and the uranium must be separated from the nitrate or it will be reoxidized quickly to the hexavalent form. The necessary separation is brought about by precipitating the uranium with aqueous ammonia to produce $U(OH)_4$, which material is filtered from the solution and washed. The washed filter cake is then converted into a colloid or sol by boiling in dilute nitric acid. The sol thus obtained is dried either by conventional slow heating means to produce shards or by passage through a drying solvent to produce spheroidal particles as described above. The particles thus produced are size graded and a selection is made of a group of particles having the desired size classification. The selected gel particles, containing the quadrivalent uranium U–238 are then contacted with fissionable material in the hexavalent form (preferably U–235) to thereby directly infuse the gel particles with the fissionable material. The step of contacting is preferably accomplished with the fissionable material being in the form of U–235 uranyl nitrate. The thus impregnated gal particles are then calcined to form the above-described dense refractory material suitable for compaction into fuel element shapes.

In the production of urania/plutonia nuclear fuel material, urania U–238 gel spheres are formed in the same manner as described above in relation to the production of urania/urania fuel material. The urania sol is dried to form gel shards or spheres, and the necessary size classification and selection is accomplished. The selected gel spheres are then contacted with plutonium in hexavalent form, preferably as plutonyl nitrate, to directly impregnate the gel with the fissionable material. The thus impregnated gel particles are then fired preparatory to compaction as described above.

What is claimed is:

1. A process for preparing a mixed oxide nuclear fuel material comprising the step of contacting a gel of a fertile nuclear material with a fissionabl material in liquid phase to directly impregnate said gel with said fissionable material.

2. The process according to claim 1 further including the precedent steps of preparing a colloid of a fertile nuclear material, and drying said colloid to form a gel, and further including the subsequent step of densifying the thus impregnated gel by calcination.

3. The process according to claim 2 wherein the fertile material is selected from the group consisting of theoria and urania, and the fissionable material is selected from the group consisting of uranium in liquid phase and plutonium in liquid phase.

4. The process according to claim 3 wherein the step of drying includes passing droplets of the colloidal fertile material through a dehydrating organic solvent whereby said droplets emerge substantially in the gel stage as spheroidal particles.

5. The process according to claim 3 wherein the gel includes a multiplicity of gel particles, and further including the steps of selecting from said multiplicity of gel particles a group of particles of a predetermined size classification, and subjecting only the selected particles to the contacting step of the process.

6. The process according to claim 3 wherein the fissionable material is in liquid solution during the step of contacting.

7. The process according to claim 4 wherein the liquid solution is an aqueous solution of the fissionable material.

8. The process according to claim 3 wherein the fissionable material is at a predetermined concentration in said liquid solution, and the step of contacting is conducted for a predetermined period of time.

9. The process according to claim 6 wherein the liquid solution is an aqueous solution of fissionable material, and the colloid is prepared as an aqueous colloid.

10. The process according to claim 3 wherein the step step of drying includes passing droplets of the colloidal fertile material through a drying solvent whereby said droplets emerge substantially in the gel stage as spheroidal particles.

11. The process according to claim 8 further including the steps of selecting from said spheroidal particles a group of particles of a predetermined size classification, and subjecting only the selected particles to the contacting step of the process.

12. The process according to claim 7 wherein the gel includes a multiplicity of gel particles, and further including the steps of selecting from said multiplicity of gel particles a group of particles of a predetermined size classification, and subjecting only the selected particles to the contacting step of the process.

13. The process according to claim 3 wherein the fertile material is thoria and the fissionable material is uranium in liquid phase.

14. The process according to claim 13 wherein the uranium is in hexavalent form at the time it is contacted with said gel.

15. The process according to claim 13 wherein the fissionable material in liquid phase is a solution of uranyl nitrate.

16. The process according to claim 15 wherein the step of preparing the colloid of thoria includes the steps of effecting thermal denitration of thorium nitrate to produce finely divided thoria powder, and mixing said thoria powder with a dilute acid to form the colloid of thoria.

17. The process according to claim 15 wherein the step of drying includes passing droplets of the colloidal thoria through a drying solvent whereby said droplets emerge substantially in the gel stage as spheroidal particles.

18. The process according to claim 17 further including the steps of selecting from said spheroidal particles a group of particles of a predetermined size classification, and subjecting only the selected particles to the contacting step of the process.

19. The process according to claim 3 wherein the fertile material is urania and the fissionable material is uranium in liquid phase.

20. The process according to claim 19 wherein the fertile material is quadrivalent and the fissionable material is a hexavalent form of uranium at the time of the step of contacting.

21. The process according to claim 19 wherein the fissionable material in liquid phase is a solution of uranyl nitrate.

22. The process according to claim 21 wherein the step of preparing the colloid of urania includes the steps of reducing a hexavalent form of uranium solution of uranyl nitrate to the quadrivalent form of uranium nitrate, precipitating the quadrivalent uranium from the uranium nitrate in the form of filter cake, converting the filter cake into a colloidal form by boiling the filter cake in a dilute acid.

23. The process according to claim 20 wherein the step of drying includes passing droplets of the colloidal urania through a drying solvent whereby said droplets emerge substantially in the gel stage as spheroidal particles.

24. The process according to claim 23 further including the steps of selecting from said spheroidal particles a group of particles of a predetermined size classification, and subjecting only the selected particles to the contacting step of the process.

25. The process according to claim 3 wherein the fertile material is urania and the fissionable material is plutonium in liquid phase.

26. The process according to claim 25 wherein the fertile material is quadrivalent urania and the fissionable material is in the form of hexavalent plutonium at the time of the step of contacting.

27. The process according to claim 25 wherein the fissionable material in liquid phase is a solution of plutonyl nitrate.

28. The process according to claim 27 wherein the step of preparing the colloid of urania includes the steps of reducing a hexavalent form of uranium solution of uranyl nitrate to the quadrivalent form of uranium nitrate, precipitating the quadrivalent uranium from the uranium nitrate in the form of filter cake, converting the filter cake into a colloidal form by boiling the filter cake in a dilute acid.

29. The process according to claim 26 wherein the step of drying includes passing droplets of colloidal urania through a drying solvent whereby said droplets emerge substantially in the gel stage as spheroidal particles.

30. The process according to claim 29 further including the steps of selecting from said spheroidal particles a group of particles of a predetermined size classification, and subjecting only the selected particles to the contacting step of the process.

No references cited.

CARL D. QUARFORTH, *Primary Examiner.*

BENJAMIN R. PADGETT, *Examiner.*

S. J. LECHERT, JR., *Assistant Examiner.*